(12) United States Patent
Kogure et al.

(10) Patent No.: US 10,900,629 B2
(45) Date of Patent: Jan. 26, 2021

(54) VEHICULAR LAMP

(71) Applicant: Stanley Electric Co., Ltd., Tokyo (JP)

(72) Inventors: Shinya Kogure, Tokyo (JP); Ryotaro Owada, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/612,721

(22) PCT Filed: May 15, 2018

(86) PCT No.: PCT/JP2018/018778
§ 371 (c)(1),
(2) Date: Nov. 11, 2019

(87) PCT Pub. No.: WO2018/212187
PCT Pub. Date: Nov. 22, 2018

(65) Prior Publication Data
US 2020/0200345 A1 Jun. 25, 2020

(30) Foreign Application Priority Data
May 18, 2017 (JP) .................................. 2017-098967

(51) Int. Cl.
*F21S 41/16* (2018.01)
*F21S 41/265* (2018.01)
(Continued)

(52) U.S. Cl.
CPC ................ *F21S 41/16* (2018.01); *B60Q 1/04* (2013.01); *B60Q 11/00* (2013.01); *F21S 41/135* (2018.01);
(Continued)

(58) Field of Classification Search
CPC ......... F21S 41/16; F21S 41/265; F21S 41/135
See application file for complete search history.

(56) References Cited

U.S. PATENT DOCUMENTS

| 7,261,449 B2 * | 8/2007 | Albou ..................... F21S 41/27 362/518 |
| 10,317,031 B2 * | 6/2019 | Tatara ................... F21S 41/285 |

(Continued)

FOREIGN PATENT DOCUMENTS

| JP | 2013-168585 A | 8/2013 |
| JP | 2014-522116 A | 8/2014 |

(Continued)

OTHER PUBLICATIONS

International Search Report of the International Search Report for PCT/JP2018/018778 dated Jul. 17, 2018.

*Primary Examiner* — William N Harris
(74) *Attorney, Agent, or Firm* — Kenealy Vaidya LLP

(57) ABSTRACT

A vehicular lamp includes a laser light source configured to radiate a laser beam, a wavelength conversion member configured to receive the laser beam and radiate white light, and a lens body disposed between the laser light source and the wavelength conversion member and configured to emit the white light, wherein the lens body has a laser beam incident surface configured to allow incidence of the laser beam, a white light incident surface configured to emit the laser beam from inside of the lens body and to allow incidence of the white light radiated from the wavelength conversion member, and an emission surface configured to emit the white light, and the wavelength conversion member is disposed to be separated from the white light incident surface.

20 Claims, 6 Drawing Sheets

(51) Int. Cl.

| | | |
|---|---|---|
| *F21S 41/135* | (2018.01) | |
| *B60Q 1/04* | (2006.01) | |
| *F21V 5/00* | (2018.01) | |
| *F21V 9/08* | (2018.01) | |
| *F21V 9/00* | (2018.01) | |
| *F21V 7/30* | (2018.01) | |
| *F21S 45/00* | (2018.01) | |
| *B60Q 11/00* | (2006.01) | |

(52) U.S. Cl.
 CPC ............ *F21S 41/265* (2018.01); *F21S 45/00* (2018.01); *F21V 5/00* (2013.01); *F21V 7/30* (2018.02); *F21V 9/00* (2013.01); *F21V 9/08* (2013.01)

(56) References Cited

U.S. PATENT DOCUMENTS

| | | | |
|---|---|---|---|
| 2006/0087860 A1* | 4/2006 | Ishida | F21S 43/243 |
| | | | 362/517 |
| 2011/0063115 A1* | 3/2011 | Kishimoto | F21K 9/00 |
| | | | 340/600 |
| 2014/0166902 A1 | 6/2014 | Berben et al. | |
| 2016/0178155 A1* | 6/2016 | Owada | F21S 41/135 |
| | | | 362/465 |
| 2016/0312978 A1 | 10/2016 | Park et al. | |
| 2016/0369965 A1* | 12/2016 | Park | F21S 41/172 |

FOREIGN PATENT DOCUMENTS

| | | |
|---|---|---|
| JP | 2016-119250 A | 6/2016 |
| WO | 2016/185851 A1 | 11/2016 |
| WO | 2016/188744 A1 | 12/2016 |

\* cited by examiner

VEHICULAR LAMP

CROSS-REFERENCE TO RELATED APPLICATIONS

This application is a U.S. National Stage Application under 35 U.S.C § 371 of International Patent Application No. PCT/JP2018/018778 filed May 15, 2018, which claims the benefit of priority to Japanese Patent Application No. 2017-098967 filed May 18, 2017, the disclosures of all of which are hereby incorporated by reference in their entireties.

TECHNICAL FIELD

The present invention relates to a vehicular lamp.
Priority is claimed on Japanese Patent Application No. 2017-098967, filed May 18, 2017, the content of which is incorporated herein by reference.

BACKGROUND ART

Patent Literature 1 discloses a lighting tool including a laser light source configured to radiate a laser beam, a wavelength conversion member configured to receive the laser beam and radiate white light, and a lens body configured to radiate the light radiated from the wavelength conversion member toward the front.

CITATION LIST

Patent Literature

Patent Literature 1

Japanese Unexamined Patent Application, First Publication No. 2016-119250

SUMMARY OF INVENTION

Technical Problem

In a structure of the related art, a lens body is disposed on a side opposite to a laser light source with respect to a wavelength conversion member. For this reason, light passage holes are required on both surface sides of the wavelength conversion member, a contact area between the wavelength conversion member and a heat sink is reduced, and thus, a center of a fluorescent body at which a light energy density is increased cannot be sufficiently cooled. Here, the inventors have conceived that the laser light source and the lens body be disposed with respect to the wavelength conversion member in the same direction, and a reflection type laser light source module be employed. In this configuration, the reflected light of the laser beam reflected by a light receiving surface of the wavelength conversion member and wavelength-converted light diffused from the wavelength conversion member are mixed to generate white light. According to the above-mentioned configuration, an effect of securing a sufficient contact area between the heat conductive member and the wavelength conversion member on a reverse surface of the light receiving surface and increasing the cooling efficiency of the wavelength conversion member can be expected. 1005o However, since one of the wavelength-converted light and the reflected light, which are mixed, is diffused light, and the other is light having high directivity, color irregularity occurs in the mixed color light. For this reason, when a reflection type laser light source module is employed in the vehicular lamp, a new problem that it is difficult to supply a white range defined by laws and regulations has occurred.

An aspect of the present invention is directed to providing a vehicular lamp capable of minimizing color irregularity while employing a structure in which the cooling efficiency can readily be increased.

Solution to Problem

A vehicular lamp of an aspect of the present invention includes a laser light source configured to radiate a laser beam; a wavelength conversion member configured to receive the laser beam and radiate white light; and a lens body disposed between the laser light source and the wavelength conversion member and configured to emit the white light, wherein the lens body has a laser beam incident surface configured to allow incidence of the laser beam radiated from the laser light source; a white light incident surface configured to emit the laser beam from inside of the lens body and to allow incidence of the white light radiated from the wavelength conversion member; and an emission surface configured to emit the white light, and the wavelength conversion member is disposed to be separated from the white light incident surface.

According to this configuration, a reflection type laser light source module can be configured by disposing the lens body between the laser light source and the wavelength conversion member. Accordingly, it is possible to provide a vehicular lamp having a long lifetime, and capable of securing a sufficient contact area between the wavelength conversion member and a cooling structure such as a heat sink or the like and increasing cooling efficiency of the wavelength conversion member.

In addition, according to this configuration, the wavelength conversion member is disposed to be separated from the white light incident surface configured to emit a laser beam from the inside of the lens body. For this reason, the light emitted from the white light incident surface can be refracted and light having various incident angles can enter the light receiving surface of the wavelength conversion member from different directions. Accordingly, a diffusion angle can be provided to the reflected light reflected by the light receiving surface of the wavelength conversion member, and the reflected light can be entirely mixed with the wavelength-converted light having high diffusibility to generate white light in which color irregularity is minimized.

In addition, according to this configuration, the white light radiated from the wavelength conversion member enters the white light incident surface. The light radiated from the wavelength conversion member can be refracted in the white light incident surface and white light can enter the lens body at a narrow diffusion angle by disposing the wavelength conversion member to be separated from the white light incident surface. When the white light is internally reflected inside of the lens body, a total reflection efficiency can be increased by appropriately setting the surface direction of the internal reflection surface.

In the aspect of the above-mentioned vehicular lamp, the laser beam incident surface may be curved in a convex lens shape.

According to this configuration, the laser beam is refracted by the laser beam incident surface in a condensing direction. Accordingly, non-parallel light can be included in the light passing through the lens body. The laser beam passing through inside of the lens body and reaching the white light incident surface can be further refracted upon emission.

As a result, a diffusion angle of the reflected light reflected by the light receiving surface of the wavelength conversion member can be increased, and an effect of minimizing color irregularity can be enhanced.

In the aspect of the above-mentioned vehicular lamp, the wavelength conversion member may have a light receiving surface perpendicular to an optical axis of the laser beam emitted from the white light incident surface.

According to this configuration, the optical axis of the reflected light reflected by the wavelength conversion member and the optical axis of the wavelength-converted light having a converted wavelength can coincide with each other, and color irregularity can be effectively minimized.

In the aspect of the above-mentioned vehicular lamp, the laser light source may allow incidence of a p-polarized laser beam with respect to the laser beam incident surface within a range of a Brewster's angle +5° from a normal direction.

According to this configuration, reflection of the laser beam at the laser beam incident surface can be minimized, and efficiency of utilization of the light can be increased.

In the aspect of the above-mentioned vehicular lamp, the vehicular lamp may include a plurality of laser light sources, wherein each of the plurality of laser light sources may cause a radiated laser beam to enter the same wavelength conversion member.

According to this configuration, since the laser beam radiated from the plurality of laser light sources is used, it is possible to provide a vehicular lamp having high illuminance.

In the aspect of the above-mentioned vehicular lamp, the vehicular lamp may include an emission detector configured to detect a light emitting state of the wavelength conversion member; and a controller connected with the laser light source and the emission detector, wherein the controller may be configured to stop radiation of the laser beam from the laser light source when the laser light source has radiated the laser beam and the emission detector has detected that the light emitting state of the wavelength conversion member is insufficient.

According to this configuration, when the wavelength conversion member has fallen, radiation of the laser beam from the laser light source can be stopped.

Accordingly, when the wavelength conversion member has fallen, emission of the laser beam from the emission surface to the outside of the lens body can be minimized.

Advantageous Effects of Invention

According to a vehicular lamp of the present invention, it is possible to provide a vehicular lamp capable of minimizing color irregularity while employing a structure in which the cooling efficiency can readily be increased.

DESCRIPTION OF EMBODIMENTS

Figure 1:
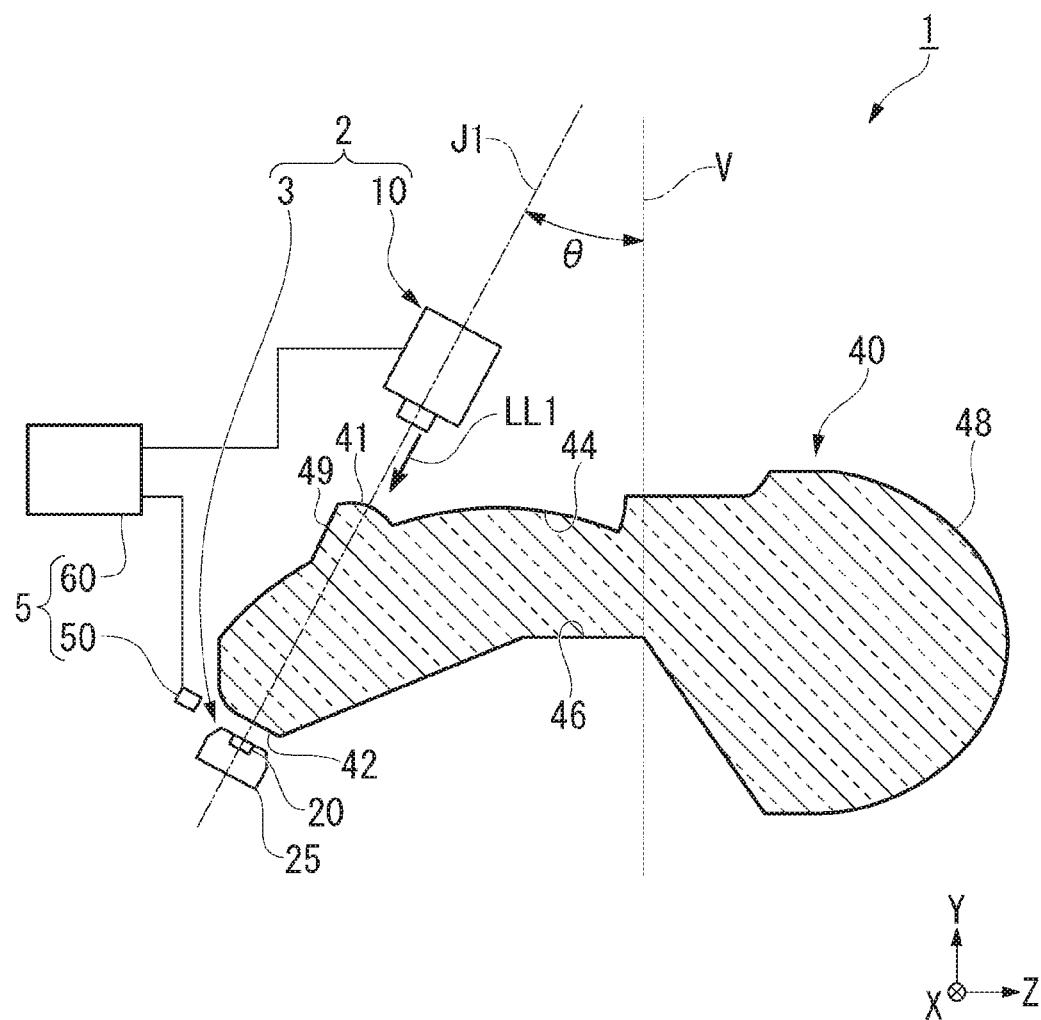
FIG. 1 is a schematic side view of a vehicular lamp of an embodiment.

Hereinafter, a vehicular lamp that is an embodiment will be described with reference to the accompanying drawings.

In the drawings used in following description, in order to make features easier to understand, portions that become the features may be enlarged and shown for the purpose of convenience, and dimensional ratios or the like of components are not always the same as the actual ones.

In the following description, a forward/rearward direction means a forward/rearward direction in a vehicle in which a vehicular lamp is mounted, and the vehicular lamp is configured to radiate light toward the front. Further, the forward/rearward direction is one direction in the horizontal surface unless the context clearly indicates otherwise. Further, the rightward/leftward direction is one direction in a horizontal surface when the direction is not particularly limited, and a direction perpendicular to the forward/rearward direction.

In the specification, "in a certain direction (a designated direction)" includes a case of a direction inclined with respect to the designated direction within a range of less than 45°, in addition to a case of a strictly designated direction.

In the specification, a phrase that two points are "disposed close to each other" includes not only a case in which the two points are simply close to each other but also a case in which the two points coincide with each other.

In addition, in the drawings, an XYZ coordinate system is shown appropriately as a 3-dimensional orthogonal coordinate system. In the XYZ coordinate system, a Y-axis direction is an upward/downward direction (a vertical direction) and a +Y direction is an upward direction. In addition, a Z-axis direction is a forward/rearward direction, and a +Z direction is a forward direction (to the front). Further, an X-axis direction is a rightward/leftward direction.

FIG. 1 is a schematic side view of a vehicular lamp 1 of the embodiment.

Further, in FIG. 1, a cross section of a lens body 40 is shown.

The vehicular lamp 1 includes a laser light source 10, a wavelength conversion member 20, a holding member 25 configured to hold the wavelength conversion member 20, the lens body 40 disposed between the laser light source 10 and the wavelength conversion member 20, an emission detector 50, and a controller 60. The wavelength conversion member 20 and the holding member 25 configure a light emitting unit 3. In addition, the light emitting unit 3 and the laser light source 10 configure a laser light source module 2. The emission detector 50 and the controller 60 configure a control unit 5.

(Laser Light Source Module)

The laser light source module 2 has the laser light source 10 and the light emitting unit 3. The laser light source 10 is a semiconductor laser light source such as a laser diode or the like configured to radiate a laser beam LL1 in a blue range (for example, an emission wavelength is 450 nm). The laser light source 10 radiates the laser beam LL1 to an optical axis J1 direction inclined rearward with respect to a vertical line V by an angle θ. The laser light source 10 is fixed to the vehicle on which the vehicular lamp 1 is mounted by a fixing member (not shown).

The wavelength conversion member 20 is disposed to face the laser light source 10. The wavelength conversion member 20 receives the laser beam LL1 radiated from the laser light source 10 and radiates white light. The wavelength conversion member 20 is held by the holding member 25. The light emitting unit 3 constituted by the wavelength conversion member 20 and the holding member 25 is fixed to the vehicle on which the vehicular lamp 1 is mounted by a fixing member (not shown).

Figure 2:
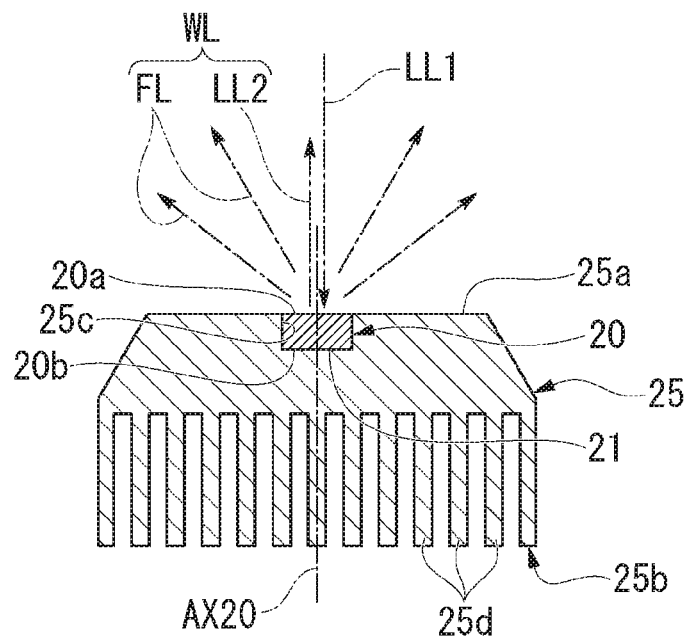
FIG. 2 is a schematic cross-sectional view of a light emitting unit of the vehicular lamp of the embodiment.

FIG. 2 is a schematic cross-sectional view of the light emitting unit 3.

In the embodiment, the wavelength conversion member 20 is a rectangular plate-shaped fluorescent body. The wavelength conversion member 20 has a light receiving surface 20a facing the laser light source 10 and configured to receive the laser beam LL1, and a back surface 20b directed to a side opposite to the light receiving surface 20a. The light receiving surface 20a is perpendicular to an optical axis of the laser beam LL1 radiated from the laser light source 10. In addition, a reflection film 21 is formed on the back surface 20b.

The wavelength conversion member 20 receives the laser beam LL1 radiated from the laser light source 10, converts at least a part of the laser beam into light having different wavelengths, and radiates wavelength-converted light FL having a yellow color from the light receiving surface 20a. In addition, the wavelength conversion member 20 reflects the laser beam LL1 radiated from the laser light source 10 as reflected light LL2 having a blue color. The wavelength-converted light FL having a yellow color and the reflected light LL2 having a blue color are mixed to form white light WL. That is, the wavelength conversion member 20 receives the laser beam LL1 and radiates the white light WL.

Further, the reflection film 21 formed on the back surface 20b of the wavelength conversion member 20 reflects the laser beam LL1 passing through the wavelength conversion member 20. In addition, the reflection film 21 reflects the wavelength-converted light FL radiated toward the back surface 20b toward the light receiving surface 20a. The light radiated from the wavelength conversion member 20 can be efficiently used by providing the reflection film 21 on the back surface 20b of the wavelength conversion member 20.

The holding member 25 has a concave section 25c formed in an upper surface 25a thereof facing the laser light source 10. The wavelength conversion member 20 is fitted into the concave section 25c. Accordingly, the holding member 25 holds the wavelength conversion member 20 from a side of the back surface 20b. A plurality of fins 25d are provided on a lower surface 25b of the holding member 25. Accordingly, the holding member 25 functions as a heat sink. The holding member 25 is preferably formed of a metal having good heat radiation characteristics (an aluminum alloy or the like).

According to the embodiment, as shown in FIG. 1, since the lens body 40 is disposed between the laser light source 10 and the wavelength conversion member, the reflection type laser light source module 2 configured to mix the reflected light LL2 of the laser beam LL1 and the wavelength-converted light FL can be employed. Accordingly, a sufficient contact area between the wavelength conversion member 20 and the heat sink can be secured by disposing the heat sink (in the embodiment, the holding member 25) on a side opposite to the lens body 40 with the wavelength conversion member 20. Accordingly, according to the embodiment, it is possible to provide the vehicular lamp 1 having a long lifetime, in which cooling efficiency of the wavelength conversion member 20 is increased.

(Control Unit)

As shown in FIG. 1, the control unit 5 controls the laser light source module 2. The control unit 5 has the emission detector 50 and the controller 60.

The emission detector 50 is disposed in the vicinity of the wavelength conversion member 20. The emission detector 50 detects light that does not enter the lens body 40 or leakage light leaked from the lens body 40 among the light radiated from the wavelength conversion member 20. The light detected by the emission detector 50 is at least one of the white light WL and the wavelength-converted light FL (i.e., yellow light) radiated from the wavelength conversion member 20. Accordingly, the emission detector 50 detects a light emitting state of the wavelength conversion member 20. Further, in the specification, "detecting the light emitting state of the wavelength conversion member" means detecting an intensity of light radiated from the wavelength conversion member.

The controller 60 is electrically connected to the laser light source 10 and the emission detector 50. The controller 60 monitors the light emitting state of the wavelength conversion member 20 based on the signal transmitted from the emission detector 50. In addition, the controller 60 controls the laser light source 10.

The controller 60 has, for example, a central processing unit (CPU), a random access memory (RAM), and the like, which are not shown. The controller 60 compares a detection result of the emission detector 50 with a predefined threshold, and controls the laser light source 10 such that the laser beam LL1 is not discharged based on the comparison result by executing a predetermined program in the CPU.

Next, a specific operation of the control unit 5 will be described.

When the wavelength conversion member 20 is held by the holding member 25 and disposed at a fixed position, the emission detector 50 receives yellow light (or white light), and emits a detection signal according to the amount of light received to the controller 60. Meanwhile, when the wavelength conversion member 20 falls from the fixed position for any reason, the emission detector 50 does not receive the yellow light (or white light) and does not emit the detection signal (or emits a signal so that the light was not detected). Here, a value that is smaller than a value of a detection signal of the emission detector 50 when the wavelength conversion member 20 is disposed at the fixed position and that is larger than a value of the detection signal of the emission detector 50 when the wavelength conversion member 20 has fallen is set as a predefined threshold, and is stored in the controller 60.

The controller 60 compares the detection result detected by the emission detector 50 and the predefined threshold, and determines whether the wavelength conversion member 20 has fallen from the fixed position based on the comparison result.

The controller 60 performs control such as stopping or the like of supply of current to the laser light source 10 such that the laser beam is not discharged when the comparison result that the predefined threshold is larger than the detection signal emitted from the emission detector 50 is obtained and it is determined that the wavelength conversion member 20 has fallen from the fixed position. That is, the controller 60 stops radiation of the laser beam from the laser light source 10 when the laser light source 10 radiates the laser beam LL1 and the emission detector 50 detects that the detected light emitting state of the wavelength conversion member 20 is insufficient. For this reason, according to the embodiment, when the wavelength conversion member 20 has fallen, the laser light source 10 can be turned OFF, and emission of the laser beam LL1 from an emission surface 48 toward the outside of the lens body 40 can be minimized.

(Lens Body)

Figure 3:
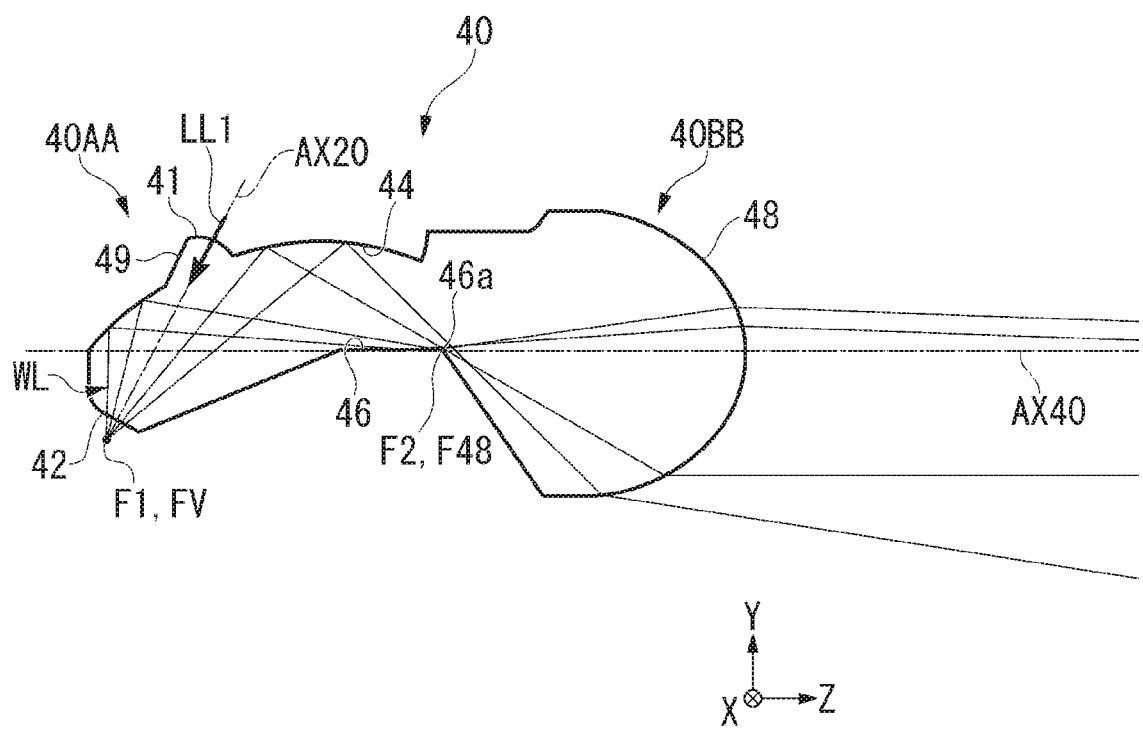
FIG. 3 is a schematic cross-sectional view of a lens body of the vehicular lamp of the embodiment.

FIG. 3 is a schematic cross-sectional view of the lens body 40. FIG. 3 shows a part of an optical path of the white light WL radiated from the light emitting unit 3. The lens body 40 radiates the white light WL radiated from the wavelength conversion member 20 toward the front.

The lens body 40 is a solid multi-face lens body having a shape extending along a forward/rearward reference axis AX40. Further, in the embodiment, the forward/rearward reference axis AX40 is an axis extending in the forward/rearward direction (the Z-axis direction) of the vehicle and serving as a reference passing through a center of the emission surface 48 of the lens body 40, which will be described in the following paragraph. The lens body 40 includes a rear end portion 40AA directed rearward, and a front end portion 40BB directed forward.

The lens body 40 may utilize a material having a higher refractive index than that of air, for example, a transparent resin such as polycarbonate, acryl, or the like, glass, or the like. In addition, when the transparent resin is used in the lens body 40, the lens body 40 can be formed through injection molding using a mold.

The lens body 40 forms a light distribution pattern for a low beam including a cutoff line on an upper edge by emitting the white light WL, which has entered the lens body 40 from the rear end portion 40AA, from the front end portion 40BB and radiating the white light WL to the front.

The rear end portion 40AA of the lens body 40 includes a white light incident surface 42 and a first reflecting surface 44. The front end portion 40BB of the lens body 40 includes the emission surface 48 that is a convex lens surface. A second reflecting surface 46 is disposed between the rear end portion 40AA and the front end portion 40BB of the lens body 40.

The lens body 40 has a laser beam incident surface 41, the white light incident surface 42, the first reflecting surface 44, the second reflecting surface 46 and the emission surface 48. The laser beam incident surface 41, the white light incident surface 42 and the first reflecting surface 44 are disposed on the rear end portion 40AA of the lens body 40. In addition, the emission surface 48 is disposed on the front end portion 40BB of the lens body 40. The second reflecting surface 46 is disposed between the rear end portion 40AA and the front end portion 40BB.

The first reflecting surface 44 is a surface for internally reflecting (preferably, totally reflecting) the white light WL entering the lens body 40 from the white light incident surface 42. The first reflecting surface 44 is configured as a reflecting surface having an elliptical sphere shape (or a free-form surface similar thereto or the like) with reference to a first focus F1 and a second focus F2 disposed in front of the first focus F1. The first focus F is disposed at a virtual light source position FV, and the second focus F2 is disposed in the vicinity of a focus F48 of the emission surface 48.

Here, the virtual light source position FV is an intersection point of the lights, which are radiated from the wavelength conversion member 20, which are refracted at the white light incident surface 42 and which has entered the lens body 40, extended in a reverse direction. The virtual light source position FV is a position of the light source when it is assumed that the light source is disposed integrally in the lens body 40.

Since the elliptical reflecting surface has a property of condensing the light passing through one focus to the other focus, the first reflecting surface 44 internally reflects the white light entering the lens body 40 and condenses the white light to the second focus F2. In addition, the first reflecting surface 44 internally reflects the light radiated from a position deviated from the first focus F1 toward above or below the second focus.

The second reflecting surface 46 is a surface for internally reflecting (preferably, totally reflecting) at least a part of the white light WL internally reflected by the first reflecting surface 44. The second reflecting surface 46 of the embodiment extends rearward in a substantially horizontal direction from the vicinity of the focus F48 of the emission surface 48. In addition, in the embodiment, the second reflecting surface 46 is a plane. Further, the second reflecting surface 46 may be a surface inclined with respect to a horizontal plane or may be a curved surface.

A front edge 46a of the second reflecting surface 46 includes an edge shape that shields a part of the white light WL internally reflected by the first reflecting surface 44 and forms a cutoff line of a light distribution pattern for a low beam. The front edge 46a of the second reflecting surface 46 is disposed in the vicinity of the focus F48.

The emission surface 48 emits the white light WL passing through the lens body 40 toward the front. The emission surface 48 is a convex lens surface protruding forward. The emission surface 48 is configured while having the focus F48 that substantially coincides with the second focus F2 as a reference point. Further, in the specification, the focus F48 of the emission surface 48 means a point disposed at a center of a condensing area in which the light is condensed in front of the emission surface 48 when the light emitted from the emission surface 48 forms a desired light distribution pattern.

The emission surface 48 emits the white light WL reflected by the second reflecting surface 46 and reached the emission surface 48 and the white light WL reached the emission surface 48 without being reflected by the second reflecting surface 46, among the white light WL internally reflected by the first reflecting surface 44. Further, the white light WL reflected by the second reflecting surface 46 and reached the emission surface 48 is emitted downward from above the forward/rearward reference axis AX40 in the emission surface 48. In addition, the white light WL reached the emission surface 48 without being reflected by the second reflecting surface 46 is emitted substantially parallelly from below the forward/rearward reference axis AX40 in the emission surface 48. These emitted lights overlap each other in front of the vehicular lamp 1. That is, the light internally reflected by the second reflecting surface 46 is returned at the front edge 46a of the second reflecting surface 46 and is superimposed under the cutoff line.

Figure 4:
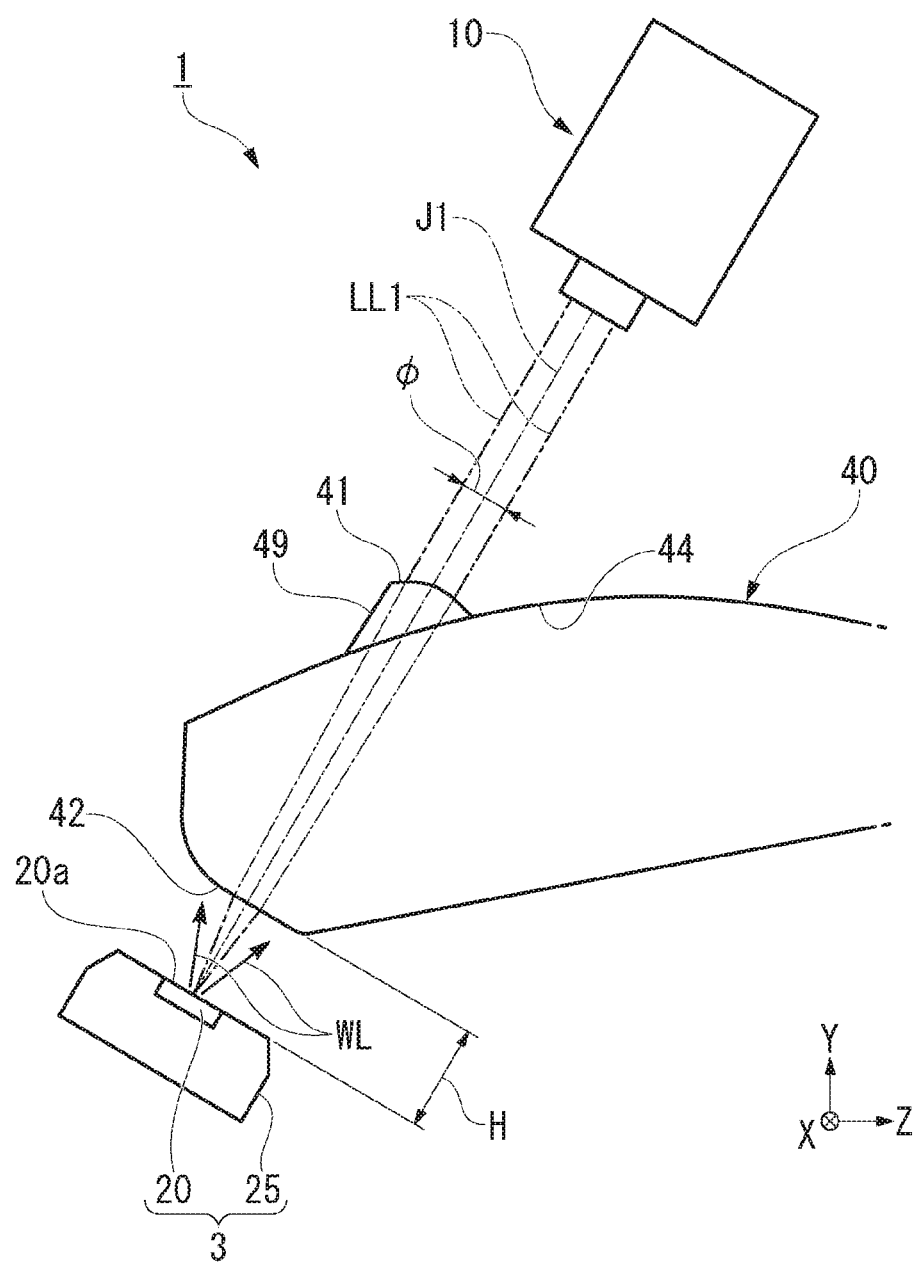
FIG. 4 is a schematic cross-sectional view of the vehicular lamp of the embodiment, showing an optical path of a laser beam radiated from the laser light source.

FIG. 4 is a schematic cross-sectional view of the vehicular lamp 1 in the vicinity of the rear end portion 40AA of the lens body 40, showing an optical path of the laser beam LL1 radiated from the laser light source 10.

The lens body 40 is disposed between the laser light source 10 and the wavelength conversion member 20 in the rear end portion 40AA. The laser beam incident surface 41 and the white light incident surface 42 are provided on the rear end portion 40AA of the lens body 40. In the embodiment, the laser beam incident surface 41 and the white light incident surface 42 are disposed on a linear line that connects the laser light source 10 and the wavelength conversion member 20.

The laser beam incident surface 41 is provided on a swelling section 49 formed to swell outward from the first reflecting surface 44. The laser beam incident surface 41 is disposed to face the laser light source 10. The laser beam LL1 radiated from the laser light source 10 enters the laser beam incident surface 41.

The laser beam incident surface 41 is curved in a convex lens shape. The laser beam LL1 radiated from the laser light source 10 is refracted in the laser beam incident surface 41 and refracted toward an optical axis J of the laser beam LL1. That is, the laser beam LL1 entering the lens body 40 is condensed by the laser beam incident surface 41.

Further, here, the optical axis J1 of the laser beam LL1 is a central axis of a light flux of the laser beam LL1.

In other words, the laser beam LL1 is a reference line passing through a center of a spot of the laser beam LL1.

The white light incident surface 42 is disposed to face the wavelength conversion member 20 with a gap interposed therebetween. In the embodiment, the white light incident surface 42 is perpendicular to the optical axis J1 of the laser beam LL1 passing through the lens body 40.

The white light incident surface 42 emits the laser beam LL1 from the inside of the lens body 40 toward the wavelength conversion member 20. The laser beam LL1 includes light reaching the white light incident surface 42 from different directions because the laser beam is refracted in the condensing direction at the laser beam incident surface 41 having a curved shape when the laser beam enters the lens body 40.

Accordingly, the laser beam LL1 reached the white light incident surface 42 in the lens body 40 is further refracted in a direction approaching (or a direction separated from) the optical axis J1 when emitted from the white light incident surface 42, and enters the wavelength conversion member 20.

According to the embodiment, since the wavelength conversion member 20 is disposed to be separated from the white light incident surface 42, light having different incident angles can enter the light receiving surface 20*a* of the wavelength conversion member 20 by refracting the laser beam LL1 emitted from the white light incident surface 42. Accordingly, a diffusion angle can be provided to the reflected light LL2 (see FIG. 2) reflected by the light receiving surface 20*a* of the wavelength conversion member 20, and the reflected light LL2 and the wavelength-converted light FL can be entirely mixed. As a result, the white light WL in which color irregularity is minimized can enter the lens body 40, and the white light WL in which color irregularity is minimized can be emitted from the emission surface 48.

Further, in the conventional reflection type laser light source module in the related art, the wavelength conversion member and the lens body are brought into contact with each other in order to take the light radiated from the wavelength conversion member and diffused widely efficiently into the lens body.

According to the embodiment, since the laser beam incident surface 41 is curved in a convex lens shape, the laser beam LL1 is refracted in the lens body 40 in the condensing direction. Accordingly, non-parallel light can be included in the laser beam LL1 passing through the lens body 40, and the laser beam passing through the lens body and reaching the white light incident surface can be refracted in different directions upon emission. As a result, a diffusion angle of the reflected light LL2 reflected by the light receiving surface 20*a* of the wavelength conversion member 20 can be increased, and an effect of minimizing color irregularity can be enhanced.

Further, in the embodiment, this configuration of condensing the laser beam LL1 in the laser beam incident surface 41 has been described. However, including the light in different directions in the light reaching the white light incident surface 42 inside the lens body 40 will be sufficient, and for example, a configuration in which the condensing lens is disposed between the laser light source 10 and the laser beam incident surface 41 may be employed.

According to the embodiment, the light receiving surface 20*a* of the wavelength conversion member 20 is perpendicular to the optical axis J1 of the laser beam LL1 emitted from the white light incident surface 42. Accordingly, it is possible to make the optical axis of the reflected light LL2 (see FIG. 2) reflected in the wavelength conversion member 20 and the optical axis of the wavelength-converted light FL (see FIG. 2) coincide with each other. Accordingly, the reflected light LL2 can be made to overlap throughout the entire wavelength-converted light FL that is diffused, and color irregularity of the white light WL can be effectively minimized.

Figure 5:
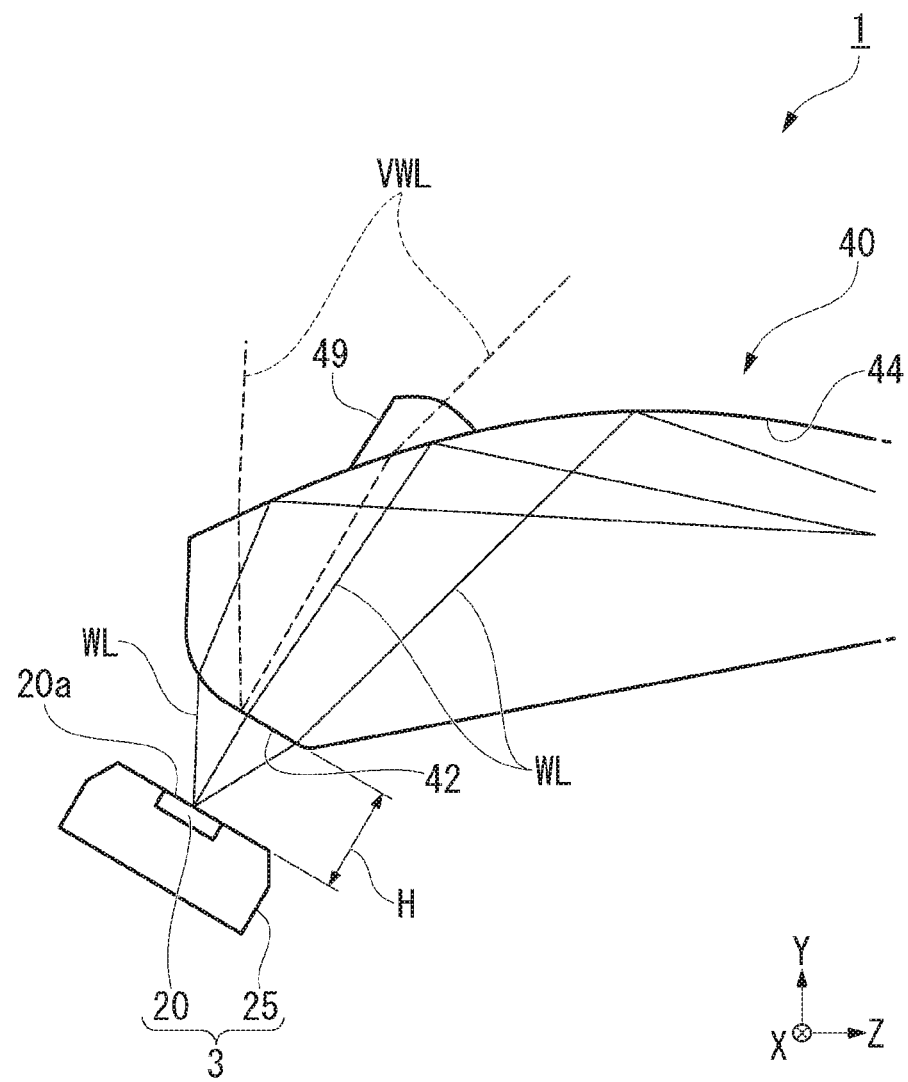
FIG. 5 is a schematic cross-sectional view of the vehicular lamp of the embodiment, showing an optical path of white light radiated from a wavelength conversion member.

FIG. 5 is a schematic cross-sectional view of the vehicular lamp 1 in the vicinity of the rear end portion 40AA of the lens body 40, showing an optical path of the white light WL radiated from the wavelength conversion member 20.

As shown in FIG. 5, the white light WL radiated from the wavelength conversion member 20 is refracted to enter the white light incident surface 42.

According to the embodiment, since the wavelength conversion member 20 is disposed to be separated from the white light incident surface 42, the white light WL radiated from the wavelength conversion member 20 can be refracted at the white light incident surface 42, and the white light WL that is made to have a narrow diffusion angle can enter the lens body 40. Accordingly, when the white light WL is internally reflected by the first reflecting surface 44 of the lens body 40, total reflection efficiency can be increased by narrowing a range of the incident angle with respect to the first reflecting surface 44.

Further, as a comparative example, FIG. 5 shows an optical path of a virtual white light VWL radiated from a wavelength conversion member in contact with a white light incident surface. As shown in FIG. 5, when the wavelength conversion member is in contact with the white light incident surface, since a diffusion angle of the virtual white light VWL passing through the lens body is large, efficiency of utilization of the light is decreased since it is not totally reflected in the first reflecting surface 44.

A distance H between the wavelength conversion member 20 and the white light incident surface 42 is preferable to be a distance in which the white light WL radiated from the wavelength conversion member 20 can be sufficiently taken in. The white light WL radiated from the wavelength conversion member 20 has Lambertian intensity properties. Among these, setting a direction perpendicular with respect to a surface of the wavelength conversion member 20 as a reference, for example, the distance H is set such that the light radiated within an angle range of 70° enters the lens body 40 via the white light incident surface 42 of the lens body 40. The angle range in which the white light WL enters the lens body 40 may be 70° or less.

In addition, the distance H is appropriately set such that a larger amount of light satisfy conditions of total reflection when the white light WL enters the first reflecting surface 44 of the lens body 40.

<Variant 1>

Figure 6:
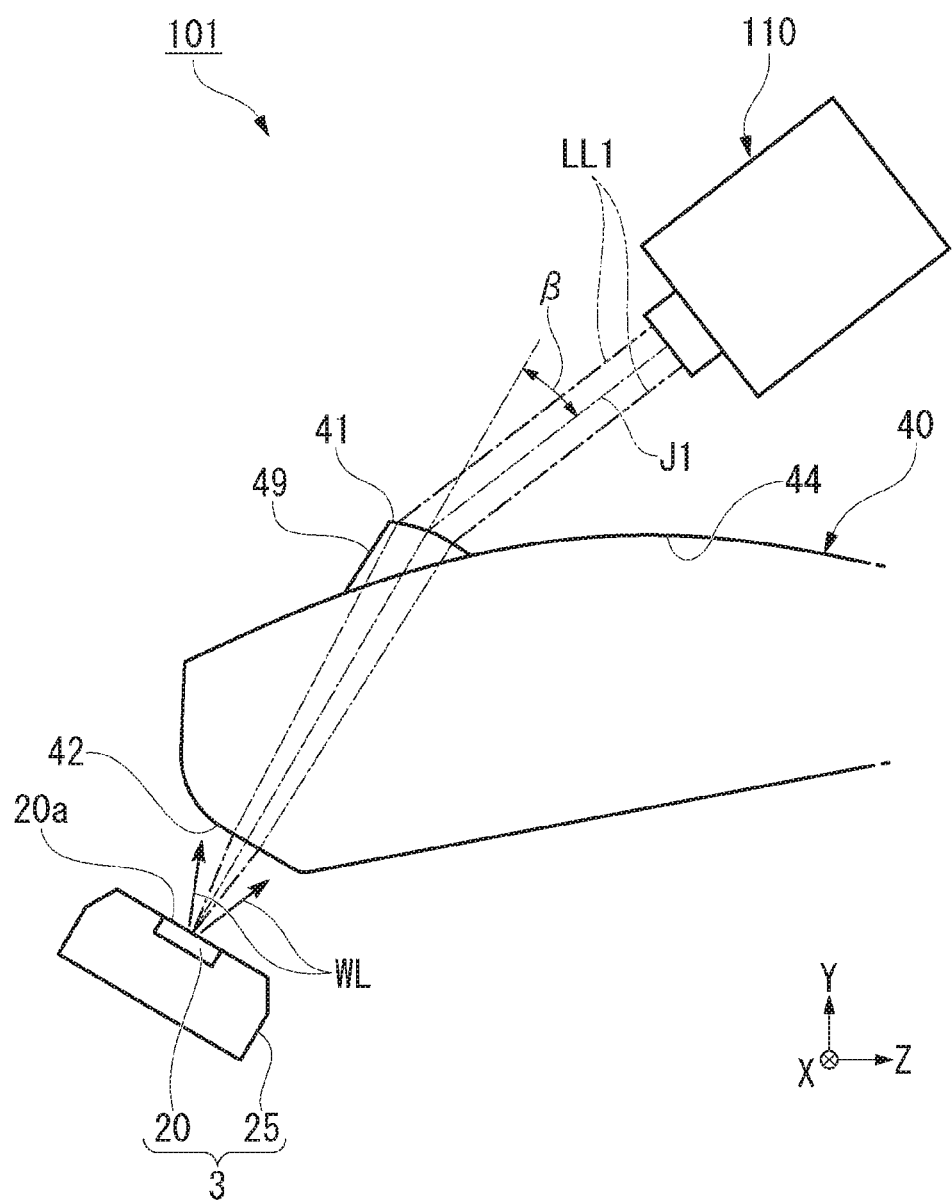
FIG. 6 is a schematic cross-sectional view of a vehicular lamp of Variant 1.

FIG. 6 is a schematic cross-sectional view of a vehicular lamp 101 of Variant 1 of the above-mentioned embodiment. The vehicular lamp 101 of Variant 1 is distinguished from the above-mentioned vehicular lamp 1 in that a laser light source 110 is configured mainly differently.

Like the above-mentioned embodiment, the vehicular lamp 101 includes the laser light source 110, the wavelength conversion member 20, and the lens body 40.

In the variant, the laser light source 110 radiates a p-polarized laser beam LL1. In addition, the laser light source 110 causes the laser beam LL1 to enter the laser beam incident surface 41 at the vicinity of a Brewster's angle 1. More specifically, the laser beam LL1 enters the laser beam incident surface 41 within a range of the Brewster's angle $\beta+5°$ from a normal direction. In general, it is known that the reflection coefficient becomes 0 when p-polarized light enters at the Brewster's angle. Since the laser beam LL1 enters the laser beam incident surface 41 within the range of the Brewster's angle $\beta+5°$ from the normal direction, the reflection coefficient of the laser beam LL1 with respect to the laser beam incident surface 41 can be sufficiently decreased. That is, according to the variant, reflection of the laser beam LL1 in the laser beam incident surface 41 can be minimized, and efficiency of utilization of the light can be increased. Further, since the laser beam LL1 can enter the laser beam incident surface 41 within the range of the Brewster's angle $\beta\pm5°$, the above-mentioned effects can be remarkably obtained.

Further, in addition to causing the p-polarized laser beam LL1 to enter at the Brewster's angle $\beta$, similar effects can be obtained also by forming an anti-reflection film on the white light incident surface 42. However, according to the variant, reflection can be prevented without forming the anti-reflection film and efficiency of utilization of the laser beam LL1 can be increased by using inherent linear polarization of the laser beam LL1.

<Variant 2>

Figure 7:
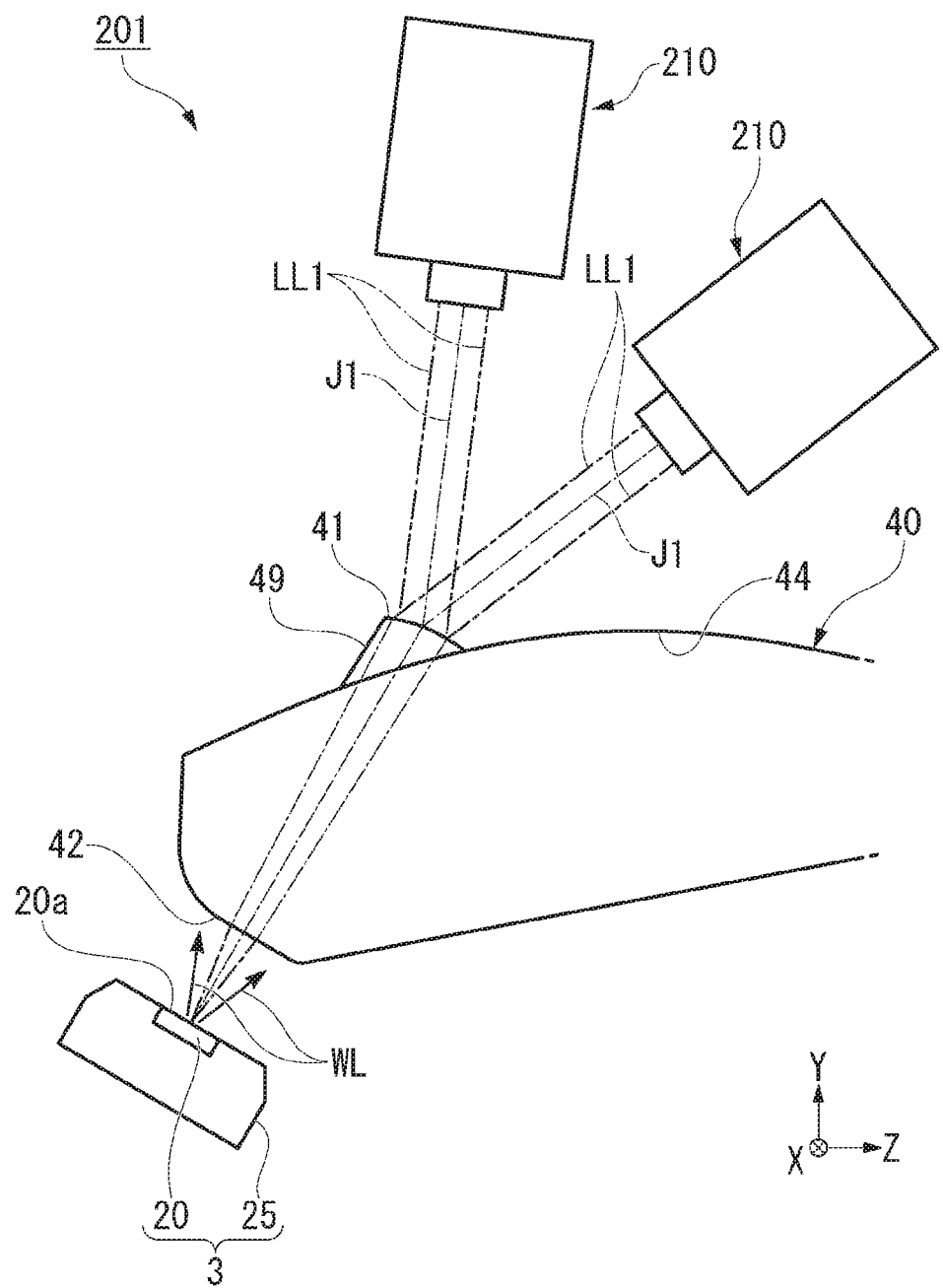
FIG. 7 is a schematic cross-sectional view of a vehicular lamp of Variant 2.

FIG. 7 is a schematic cross-sectional view of a vehicular lamp 201 according to Variant 2 of the above-mentioned embodiment. The vehicular lamp 201 of Variant 2 is distinguished from the above-mentioned vehicular lamp 1 in that a plurality of laser light sources 210 are provided.

Like the above-mentioned embodiment, the vehicular lamp 201 includes the plurality of laser light sources 210, the wavelength conversion member 20, and the lens body 40. The plurality of laser light sources 210 each causes the laser beam LL1 to enter the laser beam incident surface 41 of the lens body 40. Like the above-mentioned embodiment, the laser beam LL1 entering the laser beam incident surface 41 is emitted from the white light incident surface 42 and enters the wavelength conversion member 20. That is, the plurality of laser light sources 210 each causes the laser beam LL1 radiated therefrom to enter the same wavelength conversion member 20.

According to the embodiment, since the laser beam LL1 radiated from the plurality of laser light sources 210 is used, it is possible to provide the vehicular lamp 201 having high illuminance.

Further, the plurality of laser light sources 210 each may be configured to cause the p-polarized laser beam LL1 to enter the vicinity of the Brewster's angle.

Accordingly, reflection in the laser beam incident surface 41 of the laser beam LL1 radiated from the plurality of laser light sources 210 can be minimized, and efficiency of utilization of the laser beam LL1 can be increased.

Hereinabove, while the embodiment and the variants thereof of the present invention have been described, the components, combinations thereof, and the like, in the embodiment are exemplary, and additions, omissions, substations and other modifications of the components may be made without departing from the scope of the present invention. In addition, the present invention is not limited to the embodiment.

REFERENCE SIGNS LIST 1, 101, 201 Vehicular lamp
10, 110, 210 Laser light source
20 Wavelength conversion member
20a Light receiving surface
40 Lens body
41 Laser beam incident surface
42 White light incident surface
48 Emission surface
50 Emission detector
60 Controller
J1 Optical axis
LL1 Laser beam
LL2 Reflected light
FL Wavelength-converted light
WL White light

The invention claimed is:

1. A vehicular lamp comprising:
a laser light source configured to radiate a laser beam;
a wavelength conversion member configured to receive the laser beam and radiate white light; and
a lens body disposed between the laser light source and the wavelength conversion member and configured to emit the white light,
wherein the lens body has:
a laser beam incident surface configured to allow incidence of the laser beam radiated from the laser light source;
a white light incident surface configured to emit the laser beam from inside of the lens body and to allow incidence of the white light radiated from the wavelength conversion member; and
an emission surface configured to emit the white light,
the wavelength conversion member is disposed to be separated from the white light incident surface, and
the wavelength conversion member has a light receiving surface perpendicular to an optical axis of the laser beam emitted from the white light incident surface.

2. The vehicular lamp according to claim 1, wherein the laser beam incident surface is curved in a convex lens shape.

3. The vehicular lamp according to claim 1, wherein the laser light source allows incidence of a p-polarized laser beam with respect to the laser beam incident surface within a range of a Brewster's angle +5° from a normal direction.

4. The vehicular lamp according to claim 1, comprising a plurality of laser light sources,
wherein each of the plurality of laser light sources causes a radiated laser beam to enter the same wavelength conversion member.

5. The vehicular lamp according to claim 1, comprising:
an emission detector configured to detect a light emitting state of the wavelength conversion member; and
a controller connected with the laser light source and the emission detector,
wherein the controller is configured to stop radiation of the laser beam from the laser light source based on a comparison result between a predefined threshold and the light emitting state of the wavelength conversion member detected by the emission detector while the laser light source is radiating the laser beam.

6. The vehicular lamp according to claim 2, wherein the laser light source allows incidence of a p-polarized laser beam with respect to the laser beam incident surface within a range of a Brewster's angle +5° from a normal direction.

7. The vehicular lamp according to claim 2, further comprising a plurality of laser light sources,
wherein each of the plurality of laser light sources causes a radiated laser beam to enter the same wavelength conversion member.

8. The vehicular lamp according to claim 2, further comprising:
an emission detector configured to detect a light emitting state of the wavelength conversion member; and
a controller connected with the laser light source and the emission detector,
wherein the controller is configured to stop radiation of the laser beam from the laser light source based on a comparison result between a predefined threshold and the light emitting state of the wavelength conversion member detected by the emission detector while the laser light source is radiating the laser beam.

9. The vehicular lamp according to claim 3, further comprising a plurality of laser light sources,
wherein each of the plurality of laser light sources causes a radiated laser beam to enter the same wavelength conversion member.

10. The vehicular lamp according to claim 3, further comprising:
an emission detector configured to detect a light emitting state of the wavelength conversion member; and
a controller connected with the laser light source and the emission detector,
wherein the controller is configured to stop radiation of the laser beam from the laser light source based on a comparison result between a predefined threshold and the light emitting state of the wavelength conversion member detected by the emission detector while the laser light source is radiating the laser beam.

11. The vehicular lamp according to claim 4, further comprising:
an emission detector configured to detect a light emitting state of the wavelength conversion member; and
a controller connected with the laser light source and the emission detector,
wherein the controller is configured to stop radiation of the laser beam from the laser light source based on a comparison result between a predefined threshold and the light emitting state of the wavelength conversion member detected by the emission detector while the laser light source is radiating the laser beam.

12. The vehicular lamp according to claim 6, further comprising a plurality of laser light sources,
wherein each of the plurality of laser light sources causes a radiated laser beam to enter the same wavelength conversion member.

13. The vehicular lamp according to claim 6, further comprising:
an emission detector configured to detect a light emitting state of the wavelength conversion member; and
a controller connected with the laser light source and the emission detector,
wherein the controller is configured to stop radiation of the laser beam from the laser light source based on a comparison result between a predefined threshold and the light emitting state of the wavelength conversion member detected by the emission detector while the laser light source is radiating the laser beam.

14. The vehicular lamp according to claim 1,
wherein the white light incident surface is disposed to face the light receiving surface.

15. The vehicular lamp according to claim 2,
wherein the white light incident surface is disposed to face the light receiving surface.

16. The vehicular lamp according to claim 3,
wherein the white light incident surface is disposed to face the light receiving surface.

17. The vehicular lamp according to claim 14,
wherein the wavelength conversion member has a reflection film at an opposite side of the wavelength conversion member to which the light receiving surface is formed.

18. The vehicular lamp according to claim 15,
wherein the wavelength conversion member has a reflection film at an opposite side of the wavelength conversion member to which the light receiving surface is formed.

19. The vehicular lamp according to claim 16,
wherein the wavelength conversion member has a reflection film at an opposite side of the wavelength conversion member to which the light receiving surface is formed.

20. The vehicular lamp according to claim 5,
wherein the wavelength conversion member has a reflection film at an opposite side of the wavelength conversion member to which the light receiving surface is formed.

* * * * *